United States Patent [19]

Yatka

[11] Patent Number: 5,536,511
[45] Date of Patent: Jul. 16, 1996

[54] CHEWING GUM PELLET COATED WITH A HARD COATING CONTAINING ERYTHRITOL AND XYLITOL

[75] Inventor: Robert J. Yatka, Orland Park, Ill.

[73] Assignee: Wm. Wrigley Jr. Company, Chicago, Ill.

[21] Appl. No.: 436,880

[22] Filed: May 8, 1995

Related U.S. Application Data

[63] Continuation of Ser. No. 310,842, Sep. 22, 1994, abandoned, which is a continuation-in-part of Ser. No. 238,905, filed as PCT/US93/09354, Sep. 30, 1993, and a continuation in part of PCT/US93/08730, Sep. 15, 1993 abandoned.

[51] Int. Cl.$^6$ .................................................. A23G 3/30
[52] U.S. Cl. .............................. 426/5; 426/303; 426/305; 426/548; 426/804
[58] Field of Search ............................ 426/3–6, 303, 426/305, 548, 804

[56] References Cited

U.S. PATENT DOCUMENTS

| | | | |
|---|---|---|---|
| 3,899,593 | 8/1975 | Hammond et al. | 426/3 |
| 4,000,320 | 12/1976 | Klose et al. | 426/3 |
| 4,065,578 | 12/1977 | Reggio et al. | 426/3 |
| 4,105,801 | 8/1978 | Dogliotti | 426/99 |
| 4,127,677 | 11/1978 | Fronczkowski et al. | 426/5 |
| 4,146,653 | 3/1979 | Mader et al. | 427/3 |
| 4,238,510 | 12/1980 | Cherukuri et al. | 426/5 |
| 4,317,838 | 3/1982 | Cherukuri et al. | 426/5 |
| 4,382,963 | 5/1983 | Klose et al. | 426/3 |
| 4,423,086 | 12/1983 | Devos et al. | 427/3 |
| 4,681,766 | 7/1987 | Huzinec et al. | 426/5 |
| 4,753,790 | 6/1988 | Silva et al. | 424/440 |
| 4,786,511 | 11/1988 | Huzinec et al. | 426/5 |
| 4,792,453 | 12/1988 | Reed et al. | 426/5 |
| 4,828,845 | 5/1989 | Zamudio-Tena et al. | 426/5 |
| 4,840,797 | 6/1989 | Boursier | 424/475 |
| 4,902,525 | 2/1990 | Kondou | 426/548 |
| 4,931,294 | 6/1990 | Yatka et al. | 426/3 |
| 4,933,188 | 6/1990 | Cherukuri et al. | 426/3 |
| 4,976,972 | 12/1990 | Patel et al. | 426/3 |
| 5,080,916 | 1/1992 | Kondou | 426/96 |
| 5,120,550 | 6/1992 | Van der Schueren | 426/3 |
| 5,135,761 | 8/1992 | Dave et al. | 426/5 |
| 5,156,866 | 10/1992 | Sato et al. | 426/5 |
| 5,206,042 | 4/1993 | Dave et al. | 426/5 |
| 5,248,508 | 9/1993 | Reed et al. | 426/5 |
| 5,270,061 | 12/1993 | Reed et al. | 426/5 |
| 5,273,771 | 12/1993 | Rapaille et al. | 426/548 |
| 5,376,389 | 12/1994 | Reed et al. | 426/5 |
| 5,397,579 | 3/1995 | Yatka et al. | 426/3 |

FOREIGN PATENT DOCUMENTS

| | | |
|---|---|---|
| 0009325A1 | 4/1980 | European Pat. Off. . |
| 0273000A1 | 6/1988 | European Pat. Off. . |
| 0314739B1 | 5/1989 | European Pat. Off. . |
| 0325790A2 | 8/1989 | European Pat. Off. . |
| 0625311 | 5/1992 | European Pat. Off. ......... A23G 3/00 |
| 0497439A1 | 8/1992 | European Pat. Off. . |
| 0511761A1 | 11/1992 | European Pat. Off. . |
| 0530995A1 | 3/1993 | European Pat. Off. . |
| 0497439 | 11/1994 | European Pat. Off. ......... A23L 1/236 |
| 56-18180 | 4/1981 | Japan . |
| 64-51045 | 2/1989 | Japan . |
| 171441 | 7/1989 | Japan ............................... A23G 3/00 |
| 64-225458 | 9/1989 | Japan . |
| 104259 | 4/1990 | Japan . |
| 287659 | 10/1992 | Japan . |
| 287658 | 10/1992 | Japan . |
| 137535 | 6/1993 | Japan . |
| 292511 | 10/1994 | Japan ............................... A23L 1/03 |
| 87/2848 | 4/1987 | South Africa . |
| 2115672 | 9/1983 | United Kingdom . |
| WO93/00828 | 1/1993 | WIPO . |
| WO94/14331 | 7/1994 | WIPO . |

OTHER PUBLICATIONS

"The Evolution of Chewing Gums—Xylitol and the Prevention of Dental Caries", Xyrofin, pp. 58–61, undated.

Brochure entitled "Erythritol: new horizons in low–calory food ingredients", 4 pages, published by Cerestar, Circa (Feb. 1994).

*Food Business*, "Cerestar Shines Bright", p. 39, (Jan. 3, 1994).

*Confectionery Production*, "Erythritol: a new sweetener", pp. 182 184, 186–187, 193 (Mar. 1994).

*Confectionery Production*, "New horizons in low–calorie bulk sweeteners", pp. 637–638 (Aug. 1993).

*Primary Examiner*—Jeanette Hunter
*Attorney, Agent, or Firm*—Steven P. Shurtz; Brinks Hofer Gilson & Lione

[57] ABSTRACT

A chewing gum product comprises a gum pellet covered by a hard coating containing erythritol and xylitol. The coating may be a homogeneous material built up of layers from a single coating syrup containing erythritol and xylitol. The syrup preferably contains, on a solids basis, a blend of about 5% to about 95% erythritol and about 5% to about 95% xylitol. The coating is particularly useful in making sugarless gum products.

20 Claims, 3 Drawing Sheets

CHEWING GUM PELLET COATED WITH A HARD COATING CONTAINING ERYTHRITOL AND XYLITOL

CROSS REFERENCE TO RELATED APPLICATION

This application is a continuation of application Ser. No. 08/310,842, filed Sep. 22, 1994 now abandoned, which is a continuation-in-part of U.S. patent application Ser. No. 08/238,905, filed May 6, 1994 now abandoned. The foregoing application is hereby incorporated herein by reference.

BACKGROUND OF THE INVENTION

This invention relates to a chewing gum product with a hard coating thereon, and in particular to sugarless chewing gum products with a hard coating comprising erythritol, and methods of making such products.

Chewing gums, including pellet chewing gums, are frequently enclosed with hard or soft coatings. Coatings provide an opportunity for the manufacturer to vary product characteristics such as taste, appearance and nutritional value. In recent years, efforts have been devoted to producing sugarless hard coatings for use in chewing gum. Sugarless coatings which have been investigated include coatings containing compounds such as xylitol, sorbitol, mannitol and hydrogenated starch hydrolysates.

Erythritol has been proposed for use as a chewing gum ingredient. U.S. Pat. No. 5,120,550 discloses a chewing gum made with a sweetening agent containing erythritol and a liquid sugar alcohol.

Low calorie sweetening compositions containing meso-erythritol are disclosed in U.S. Pat. No. 5,080,916 and U.S. Pat. No. 4,902,525, EPO Patent Publication No. 0 325 790, and Japanese Patent Publications No. 89-225458 and No. 90-104259.

Japanese Patent No. 89-51045 discloses chewing gum made with a melted mixture of meso-erythritol and sugars or sugar alcohols.

EPO Patent Publication No. 0 497 439 discloses a sweetener employing the use of spray dried erythritol.

U.S. Pat. No. 5,273,771 and EPO Patent Publication No. 0 511 761 disclose a sweetening composition made up of erythritol, sorbitol, and a glucose oligomer.

PCT Publication No. W093/00828 discloses a stabilized dipeptide sweetening composition which is useful in chewing gum and may contain erythritol.

Other patents and publications which discuss erythritol include U.S. Pat. No. 4,382,963 and U.S. Pat. No. 5,156,866 (erythritol used in chewing gum); Japanese Patent Publications No. 92-287658 and No. 92-287659, both published Oct. 13, 1992, (sweetening compositions containing meso-erythritol); Japanese Patent Publication No. 93-137535 published Jun. 1, 1993, (free flowing sweetener containing erythritol) and European Patent Publication No. 0 530 995, published Mar. 10, 1993, (lozenge containing sweetener which is all or partly erythritol or maltitol).

EPO Patent Publication No. 0 009 325 and Japanese Patent Publication No. 81-18180 disclose a method of reducing dental caries with a sugarless chewing gum made with erythritol. Example VIII of these equivalent EPO and Japanese applications dust the example chewing gum composition with erythritol powder.

Sugarless xylitol coated pellet gums have become very popular and products are being manufactured in Europe and Canada. Coating with xylitol is described in U.S. Pat. No. 4,105,801, issued Aug. 8, 1978, to Dogliotti; U.S. Pat. No. 4,127,677, issued Nov. 28, 1978, to Fronczowski et al.; U.S. Pat. No. 4,681,766, issued Jul. 21, 1987 and U.S. Pat. No. 4,786,511, issued Nov. 22, 1988, to Huzinec et al.; and U.S. Pat. No. 4,828,845, issued May 9, 1989, to Zamudio-Tena et al.

The most common and lowest costing polyol used in chewing gum is sorbitol. However, panning with sorbitol has been very difficult since it is hygroscopic and does not readily crystallize. A number of patents have been published that use various procedures to coat with sorbitol, including U.K. Patent No. 2,115,672; U.S. Pat. No. 4,317,838; and U.S. Pat. No. 4,753,790. A successful sorbitol hard coating was reported in U.S. Pat. No. 4,423,086, particularly when the sorbitol was at least 99% D-sorbitol. However, the quality of coating never approached the quality of typical xylitol hard coatings.

Another coating patent, U.S. Pat. No. 4,840,797, discloses the use of maltitol in a coating. Again, a high purity in the maltitol (over 95%) was required in order to obtain a good quality coating on pellet gum. Also hydrogenated isomaltulose is disclosed as a coating material in U.S. Pat. Nos. 5,248,508 and 4,792,453.

In order to obtain coatings of lower cost, some of the xylitol is replaced by sorbitol, lactitol, or maltitol. However, these cannot be applied in the same solution, but must be applied by alternating solutions. In other words, a solution of one polyol is applied, then another solution of another polyol is applied. This is disclosed in U.S. Pat. No. 5,270,061. See also PCT Applications Serial Nos. PCT/US93/09354 (published as WO 95/08925) and PCT/US93/08730 (published as WO 95/07622), both of which are hereby incorporated by reference.

Thus far it has proven difficult to mix crystallizable polyols in a single coating solution to obtain a quality sugarless coating. A booklet entitled "The Evaluation of Chewing Gum—Xylitol and the Prevention of Dental Caries" published in 1985 by Xyrofin describes a coating formed by panning containing xylitol and up to 10% sorbitol. However, it has been difficult in practice to use more than 5% sorbitol in a xylitol panning coating, and at these low levels, the sorbitol acts as a crystallization modifier.

In an approach different from panning from a solution, U.S. Pat. No. 4,146,653 discloses a molten blend of xylitol and sorbitol that are used to form a coating.

The cost of xylitol is quite high, and replacement of the xylitol in the coating would be an advantage. There is a need for a less expensive sugarless coating for chewing gum, especially one that produces a smoother coating, dries easier and is less hygroscopic than other sugarless coatings.

SUMMARY OF THE INVENTION

The current invention involves the use of erythritol as a total or partial replacement of xylitol in sugarless pellet coating applications. Erythritol is less expensive than xylitol, but gives the same cooling effect and crunchiness to the pellet.

In one aspect, the present invention is a chewing gum product comprising a gum pellet comprising chewable gum base, a bulk portion and one or more flavoring agents; and a hard coating covering the pellet, the coating comprising erythritol.

In another aspect, the present invention is a method of making a hard coated chewing gum product comprising the steps of forming a gum center comprising chewable gum base, a bulking portion and one or more flavoring agents; and forming on the gum pellet a hard coating comprising erythritol. In some embodiments, erythritol and other sugar alcohols are applied in alternating layers. In one embodiment, erythritol and xylitol are mixed together to form a coating syrup, which is then applied to gum centers.

As noted above, when used in a hard coating, the erythritol provides a desirable cooling effect and crunchiness. Also because of its lower cost, it is an improvement over the use of xylitol for hard coating of sugarless chewing gum products. Visual perception indicates that hard shell coatings made with erythritol are smoother than comparable xylitol coatings.

The hard coating of the present invention is particularly advantageous to pellet shaped gum products where the pellet shape does not lend itself to packaging of the type that would protect the pellets from atmospheric moisture.

The foregoing and other features and advantages of the invention will become further apparent from the following detailed description. The detailed description is to be construed as illustrative rather than limitative, with the scope of the invention being defined by the appended claims and equivalents thereof.

DETAILED DESCRIPTION OF THE INVENTION AND PREFERRED EMBODIMENTS

All percentages herein are weight percentages unless otherwise specified. The term "chewing gum" also includes bubble gum and the like.

Erythritol is a tetrahydric polyol or sugar alcohol, having the empirical formula $C_4H_{10}O_4$ and the structural formula $CH_2COH-CHOH-CHOH-CH_2OH$. It can be obtained by fermenting glucose with specially selected yeast strains in appropriate aqueous nutrient media, or by treating an aqueous alkali carbonate solution of 2-buten-1,4-diol with chlorine, and saponifying the resulting chlorohydrin. Erythritol is available from Mitsubishi Kasei America, Inc., 81 Main Street, White Plains, N.Y. 10601; and from Mitsubishi Kasei Corp., outside the United States. Erythritol is also available for Cerestar S.A., Brussels, Belgium. As supplied by Mitsubishi, erythritol is a powder with a melting point of about 119° C. It has a sweetness level of about 75% of that of sucrose, and has good storage stability. Its solubility in water at room temperature is 40%. Erythritol is not approved for use in human food products or chewing gum in the United States or Europe. However, Cerestar is currently seeking regulatory approval in the U.S. and Europe to use erythritol in human food. Erythritol does not contribute to dental caries, does not cause gastric distress, and does not contribute significantly to caloric intake, giving a highly acceptable gum product.

In the present invention, erythritol is used in the coating/panning of a pellet chewing gum. Pellet or ball gum is prepared as conventional chewing gum, but formed into pellets that are pillow shaped or into balls. The pellets/balls can then be coated or panned by conventional panning techniques to make a unique, coated pellet gum. The bulk sweetener is very stable and highly water soluble, and can be easily added to a solution prepared for panning. Erythritol may be combined with sucrose, other polyols or used alone in solution as the coating on pellet gum. Erythritol can also be added as a powder blended with other powders often used in some types of conventional panning procedures. Using erythritol sweetener isolates the sweetener from other gum ingredients and modifies its release rate in chewing gum. Levels of use of erythritol may be about 1% to about 100% in the coating and about 0.5% to about 50% of the weight of the chewing gum product. Where the coating syrup also includes a sugar or sugar alcohol, the erythritol will generally comprise about 1% to about 50% of the coating. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, xylitol, hydrogenated isomaltulose and other new polyols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum and gum tragacanth, insoluble carbonates like calcium carbonate or magnesium carbonate, and talc. Erythritol also acts as a panning modifier with other panning materials to improve product quality. Antitack agents may also be added as panning modifiers, which allow the use of a variety of carbohydrates and sugar alcohols to be used in the development of new panned or coated gum products. Flavors may also be added with the erythritol sweetener to yield unique product characteristics.

Chewing gum products of the present invention, using erythritol in the hard coating, may be made with a variety of chewing gum pellet compositions.

In general, a chewing gum composition typically contains a chewable gum base portion which is essentially free of water and is water-insoluble, a water-soluble bulk portion and flavors which are typically water insoluble. The water-soluble portion dissipates with a portion of the flavor over a period of time during chewing. The gum base portion is retained in the mouth throughout the chew.

The chewing gum compositions of the present invention follow the general pattern outlined above. They may be made with erythritol as an ingredient in the bulk portion.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laureate, polyvinyl alcohol and polyvinyl pyrrolidone.

Elastomers may include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and coca butter. Commonly employed waxes include paraffin, microcrystalline and natural waxes such as beeswax and carnauba. Microcrystalline waxes, especially those with a high degree of crystallinity, may be considered bodying agents or textural modifiers.

The gum base typically also includes a filler component. The filler component may be calcium carbonate, magnesium carbonate, talc, dicalcium phosphate or the like. The filler may constitute between about 5% and about 60% of the gum base. Preferably, the filler comprises about 5% to about 50% of the gum base.

Emulsifiers, which sometimes also have plasticizing properties, include glycerol monostearate, lecithin and glycerol triacetate. Further, gum bases may also contain optional ingredients such as antioxidants, colors and flavors.

According to the preferred embodiment of the present invention, the insoluble gum base constitutes between about 5% to about 95% of the gum. More preferably the insoluble gum base comprises between about 10% and about 50% of the gum and most preferably from about 20% to about 30% of the gum. The present invention contemplates employing any commercially acceptable gum base.

The water-soluble portion of the chewing gum may further comprise softeners, sweeteners, flavoring agents and combinations thereof. The sweeteners often fulfill the role of bulking agents in the gum. The bulking agents typically comprise about 5% to about 95% of the gum composition.

Softeners are added to the chewing gum in order to optimize the chewability and mouth feel of the gum. Softeners, also known in the art as plasticizers or plasticizing agents, generally constitute between about 0.5% to about 15% of the chewing gum. Softeners contemplated by the present invention include glycerin, lecithin and combinations thereof. Further, aqueous sweetener solutions such as those containing sorbitol, hydrogenated starch hydrolysate, corn syrup and combinations thereof may be used as softeners and binding agents in gum.

As mentioned above, the erythritol coating of the present invention will most commonly be used on sugar-free gum formulations. However, sugar-gum formulations may also use a hard coating comprising erythritol. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

Generally sugarless sweeteners include components with sweetening characteristics but which are devoid of the commonly known sugars and comprise, but are not limited to, sugar alcohols such as sorbitol, mannitol, xylitol, hydrogenated starch hydrolysate, maltitol and the like, alone or in any combination.

Depending on the particular sweetness release profile and shelf-stability needed, coated or uncoated high-intensity sweeteners may be used in the chewing gum composition. High-intensity sweeteners, preferably aspartame, may be used at levels from about 0.01% to about 3.0%. Encapsulated aspartame is a high intensity sweetener with improved stability and release characteristics, as compared to free aspartame. Free aspartame can also be added, and a combination of some free and encapsulated aspartame is preferred when aspartame is used.

Flavors contemplated by the present invention include any liquid flavoring which is of food acceptable quality. The flavor may comprise essential oils, synthetic flavors, or mixtures thereof, including but not limited to oils derived from plants and fruits such as citrus oils, fruit essences, peppermint oil, spearmint oil, clove oil, oil of wintergreen, anise, and the like. Artificial flavoring components are also contemplated by the present invention. Those of ordinary skill in the art will recognize that natural and artificial flavors may be combined in any sensorially acceptable blend. All such flavors and blends are contemplated by the present invention.

Flavors may be present in the chewing gum in an amount within the range of from about 0.1% to about 10%, preferably from about 0.5% to about 3.0%, of the gum.

Optional ingredients such as colors, emulsifiers and pharmaceutical agents may also be added as separate components of the chewing gum composition, or added as part of the gum base.

Aqueous syrups, such as corn syrup and hydrogenated corn syrup maybe used, particularly if their moisture content is reduced. This can preferably be done by coevaporating the aqueous syrup with a plasticizer, such as glycerin or propylene glycol, to a moisture content of less than 10%. Preferred compositions include hydrogenated starch hydrolysate solids and glycerin. Such syrups and their methods of preparation are discussed in detail in U.S. Pat. No. 4,671,967, incorporated herein by reference.

A preferred method of manufacturing chewing gum according to the present invention is by sequentially adding the various chewing gum ingredients to any commercially available mixer known in the art. After the ingredients have been thoroughly mixed, the gum base is discharged from the mixer and shaped into the desired form such as by rolling into sheets and cutting into sticks, extruding into chunks, or casting into pellets.

Generally, the ingredients are mixed by first melting the gum base and adding it to the running mixer. The base may also be melted in the mixer itself. Color or emulsifier may also be added at this time. A softener such as glycerin may be added at this time, along with syrup and a portion of the bulking agent. Further portions of the bulking agents may be added to the mixer. Flavor is typically added with the final portion of the bulking agent. Other optional ingredients are added in the batch in a typical fashion, well known to those of ordinary skill in the art.

The coating may contain ingredients such as flavoring agents, artificial sweeteners and dispersing agents, coloring agents, film formers and binding agents. Flavoring agents contemplated by the present invention include those commonly known in the art such as essential oils, synthetic flavors or mixtures thereof, including but not limited to oils derived from plants and fruits such as citrus oils, fruit essences, peppermint oil, spearmint oil, other mint oils, clove oil, oil of wintergreen, anise and the like. The flavoring agents may be added to the coating syrup in an amount such that the coating will contain from about 0.2% to about 1.2% flavoring agent and preferably from about 0.7% to about 1.0% flavoring agent.

Artificial sweeteners contemplated for use in the coating include but are not limited to synthetic substances, saccharin, thaumatin, alitame, saccharin salts, aspartame, sucralose and acesulfame-K. The artificial sweetener may be added to the coating syrup in an amount such that the coating will contain from about 0.05% to about 0.3% and preferably from about 0.10% to about 0.15% artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention.

The dispersing agent may be added to the coating syrup in amounts such that the coating will contain from about 0.1% to about 1.0% and preferably from about 0.3% to about 0.6% of the agent.

Coloring agents are preferably added directly to the syrup in the dye or lake form. Coloring agents contemplated by the present invention include food quality dyes. Film formers preferably added to the syrup include methyl cellulose, gelatins, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup. Binding agents contemplated by the present invention include gum arabic, alginate, cellulosics, vegetable gums and the like.

The coating is initially present as a liquid syrup which contains from about 30% to about 80% or 85% of the coating ingredients previously described herein, and from about 15% or 20% to about 70% of a solvent such as water. In general, the hard coating process is carried out in a rotating pan. Sugarless gum center tablets to be coated are placed into the rotating pan to form a moving mass.

The material or syrup which will eventually form the hard coating is applied or distributed over the gum center tablets. Flavoring agents may be added before, during and after applying the syrup to the gum centers. Once the coating has dried to form a hard surface, additional syrup additions can be made to produce a plurality of coatings or multiple layers of hard coating.

In the hard coating panning procedure, syrup is added to the gum center tablets at a temperature range of from about 100° F. to about 200° F. Preferably, the syrup temperature is from about 150° F. to about 170° F. Most preferably, the syrup temperature should be maintained at about 158° F. throughout the process in order to prevent the polyol in the syrup from crystallizing. The syrup may be mixed with, sprayed upon, poured over, or added to the gum center tablets in any way known to those skilled in the art.

Each component of the coating on the gum center tablets may be applied in a single hard layer or in a plurality of hard layers. In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Preferably, no more than about 75 coats are applied to the gum center tablets. More preferably, less than about 60 coats are applied and most preferably, about 30 to about 60 coats are applied. In any event, the present invention contemplates applying an amount of syrup sufficient to yield a hard coated chewing gum product containing about 10% to about 65% coating. Preferably, the final product will contain from about 20% to about 50% hard coating.

Those skilled in the art will recognize that in order to obtain a plurality of hard coated layers, a plurality of premeasured aliquots of coating syrup may be applied to the gum center tablets. It is contemplated, however, that the volume of aliquots of syrup applied to the gum center tablets may vary throughout the coating procedure.

The present invention contemplates that a flavoring agent may be added to the syrup, or applied to the gum center tablets while the syrup coating is drying or after the coating has dried. Furthermore, the flavoring agent may be applied anywhere within the sequence of coats, for example, after the third, twelfth, eighteenth, etc., coats.

Once a coating of syrup is applied to the gum center tablets, the present invention contemplates drying the wet syrup in an inert medium. A preferred drying medium comprises air. Preferably, forced drying air contacts the wet syrup coating in a temperature range of from about 80° to about 115° F. More preferably, the drying air is in the temperature range of from about 90° to about 105° F. The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around the syrup coated gum center at a flow rate, for large scale operations, of about 2800 cubic feet per minute. If lower quantities of material are being processed, or if smaller equipment is used, lower flow rates would be used. If a flavoring agent is applied after a syrup coating has been dried, the present invention contemplates drying the flavoring agent with or without the use of a drying medium.

A wide range of changes and modifications to the embodiments of the invention described above will be apparent to persons skilled in the art. For example, while the invention is described with respect to hard-coated chewing gum, it will be appreciated that the coating process is applicable to coating other food products, such as candies, in which an erythritol coating would have utility.

EXAMPLES

The invention will now be illustrated with Examples, which are not to be construed as imposing limitations on the invention.

Three gum center compositions, having the formulas in Table 1, can be made on production scale equipment and can be used in various coated chewing gum products.

TABLE I

|  | Center Formula A | Center Formula B | Center Formula C |
| --- | --- | --- | --- |
| Sorbitol | 48.06 | 43.64 | 44.06 |
| Base | 33.0 | 33.0 | 33.0 |
| Calcium Carbonate | 13.0 | 13.0 | 13.0 |
| Glycerin | 4.0 | 6.5 | 8.0 |
| Peppermint Flavor | 1.8 | 2.5 | 1.8 |
| Water | — | 0.8 | — |
| Color | — | 0.2 | — |
| Encapsulated Aspartame | 0.14 | 0.36 | 0.14 |
| TOTAL | 100.00 | 100.00 | 100.00 |

In addition, gum center formulations in Table II without calcium carbonate can be used in coating tests.

TABLE II

|  | Center Formula D | Center Formula E | Center Formula F |
| --- | --- | --- | --- |
| Sorbitol | 48.9 | 48.9 | 48.9 |
| Base | 33.0 | 33.0 | 33.0 |
| Mannitol | 12.0 | 10.0 | 8.0 |
| Glycerin | 4.0 | 6.0 | 8.0 |
| Peppermint Flavor | 1.8 | 1.8 | 1.8 |
| Encapsulated Aspartame | 0.3 | 0.3 | 0.3 |
| TOTAL | 100.00 | 100.00 | 100.00 |

Gum center formulations can also be made using hydrogenated starch hydrolysates (HSH) that may be evaporated to 80% solids or may also be coevaporated with glycerin to give various sugar-free center formulas as in Table III.

TABLE III

|  | Center Formula G | Center Formula H | Center Formula I | Center Formula J |
|---|---|---|---|---|
| Sorbitol | 44.3 | 42.3 | 40.9 | 40.9 |
| Base | 30.0 | 30.0 | 33.0 | 33.0 |
| Mannitol | 8.0 | 12.0 | 10.0 | 8.0 |
| HSH | 14.0 | 10.0 | — | — |
| Glycerin | 2.0 | 4.0 | 4.0 | 3.0 |
| Peppermint Flavor | 1.5 | 1.5 | 1.8 | 1.8 |
| Encapsulated Aspartame | 0.2 | 0.2 | 0.3 | 0.3 |
| Coevaporated HSH/Glycerin* | — | — | 10.0 | 13.0 |
| TOTAL | 100.00 | 100.00 | 100.00 | 100.00 |

*Contains 67.5% HSH solids, 25% glycerin and 7.5% water.

The gum center formulations in Table I and II are typical of anhydrous gum formulations having less than about 1% moisture. In Table III using HSH and glycerin, formulations contain more than 1% moisture.

Gum center formulations that contain greater than 1% moisture may use liquid sorbitol (70% solids) to give center formulations that are less hygroscopic than the previous formulations in Table I, II and III. Formulas in Table IV may also be used.

TABLE IV

|  | Center Formula K | Center Formula L | Center Formula M | Center Formula N | Center Formula O |
|---|---|---|---|---|---|
| Sorbitol | 50.4 | 47.4 | 42.9 | 41.9 | 41.9 |
| Base | 27.0 | 27.0 | 35.0 | 35.0 | 35.0 |
| Sorbitol Liquid | 9.0 | 12.0 | 10.0 | 14.0 | 10.0 |
| Mannitol | 10.0 | 12.0 | 10.0 | 6.0 | — |
| Glycerin | 2.0 | — | — | 1.0 | — |
| Peppermint Flavor | 1.4 | 1.4 | 1.8 | 1.8 | 1.8 |
| Encapsulated Aspartame | 0.2 | 0.2 | 0.3 | 0.3 | 0.3 |
| Calcium Carbonate | — | — | — | — | 11.0 |
| Total | 100.00 | 100.00 | 100.00 | 100.00 | 100.00 |

Center formulations may also include various polyols, such as lactitol, maltitol, hydrogenated isomaltulose and erythritol. These polyols may actually be the major component in the center formula, as in Table V.

TABLE V

|  | Center Formula P | Center Formula Q | Center Formula R | Center Formula S |
|---|---|---|---|---|
| Base | 30.0 | 30.0 | 30.0 | 30.0 |
| Lactitol | 55.3 | — | — | — |
| Maltitol | — | 58.3 | — | — |
| Hydrogenated Isomaltulose | — | — | 55.3 | — |
| Erythritol | — | — | — | 66.3 |
| HSH | 8.0 | 8.0 | 8.0 | 2.0 |
| Glycerin | 5.0 | 2.0 | 5.0 | — |
| Peppermint Flavor | 1.5 | 1.5 | 1.5 | 1.5 |
| Encapsulated Aspartame | 0.2 | 0.2 | 0.2 | 0.2 |
| TOTAL | 100.00 | 100.00 | 100.00 | 100.00 |

Sugarless gum cores were made using the following formula (Formula T).

|  | Percent Wt. |
|---|---|
| Sorbitol | 35.62% |
| Gum Base | 31.0 |
| Mannitol | 10.0 |
| Sorbitol Solution* | 10.0 |
| Peppermint Flavor | 1.8 |
| Lecithin | 0.50 |
| Encapsulated Aspartame | 0.08 |
| Calcium Carbonate | 11.0 |

*Solution contained 70% sorbitol and 30% water.

Coating trials were done on the gum cores. For each trial, 1000 g of gum cores were used. Each gum core weighed 1.0 g and was coated to a weight of 1.6 g. The product was 37.5% coating and 62.5% gum center. The drying air temperature was 100° F. at 20% RH. The air volume varied with each application. The syrups applied in each application were as follows.

COMPARATIVE EXAMPLE A

A solution of 63.05% xylitol, 3% gum arabic as a 33% aqueous solution, 0.45% titanium dioxide ($TiO_2$) and 33.5% water was made and used to coat the sugarless gum cores of Formula T. The coating was smooth, crunchy and slightly cooling.

EXAMPLE 1

A solution of 51.6% erythritol, 5.8% gum arabic as a 33% aqueous solution, 0.65% titanium dioxide and 41.95% water was made and used to coat the sugarless gum cores of Formula T. The coating was smooth, crunchy and slightly cooling.

The erythritol coated chewing gum of Example 1 was very close to the gum coated with xylitol. The cooling effect that was created by using erythritol was similar to the xylitol cooling effect.

Coatings may also be applied in successive layers, at least one of the layers comprising erythritol, as in the following examples.

EXAMPLE 2

HYDROGENATED ISOMALTULOSE AND ERYTHRITOL COATING

Pellets made from Formula T were coated with hydrogenated isomaltulose in the first coating syrup and erythritol in the second coating syrup. The first coating solution (used for the first approximately 20 coats) contained a 61.89% hydrogenated isomaltulose solids, 33.86% water, 3.1% gum arabic as a 33% aqueous solution, and 1.15% titanium dioxide. The second coating syrup contained an 51.6% erythritol, 5.8% gum arabic as a 33% aqueous solution, 41.95% water and 0.65% titanium dioxide. The second coating solution was used for the last approximately 20 coats.

EXAMPLE 3

LACTITOL AND ERYTHRITOL COATINGS

Pellets made from Formula T were coated with lactitol in the first coating syrup, then erythritol in the second coating syrup. The first coating syrup contained 64.34% lactitol, 4.6% gum arabic as a 33% aqueous solution, 1.19% $TiO_2$ and 29.87% water. With the initial piece weight at 1 gram, pellets were coated with lactitol to a piece weight of 1.3 grams. For the second coating solution, the erythritol coating solution of Example 1 was prepared. The lactitol-coated gum was then coated with the erythritol coating solution to a piece weight of 1.6 grams.

EXAMPLE 4

MALTITOL AND ERYTHRITOL COATINGS

Pellets made from Formula T were coated with maltitol in the first coating syrup, then erythritol in the second coating syrup. A coating solution of 64.34% maltitol, 4.6% gum arabic as a 33% aqueous solution, 1.19% $TiO_2$ and 29.87% water was prepared. With the initial piece weight of 1 gram, pellets were coated with maltitol to a piece weight of 1.3 grams. The erythritol coating was prepared as in Example 1 and used to overcoat the maltitol coated pellets to a piece weight of 1.6 grams.

Figure 1:
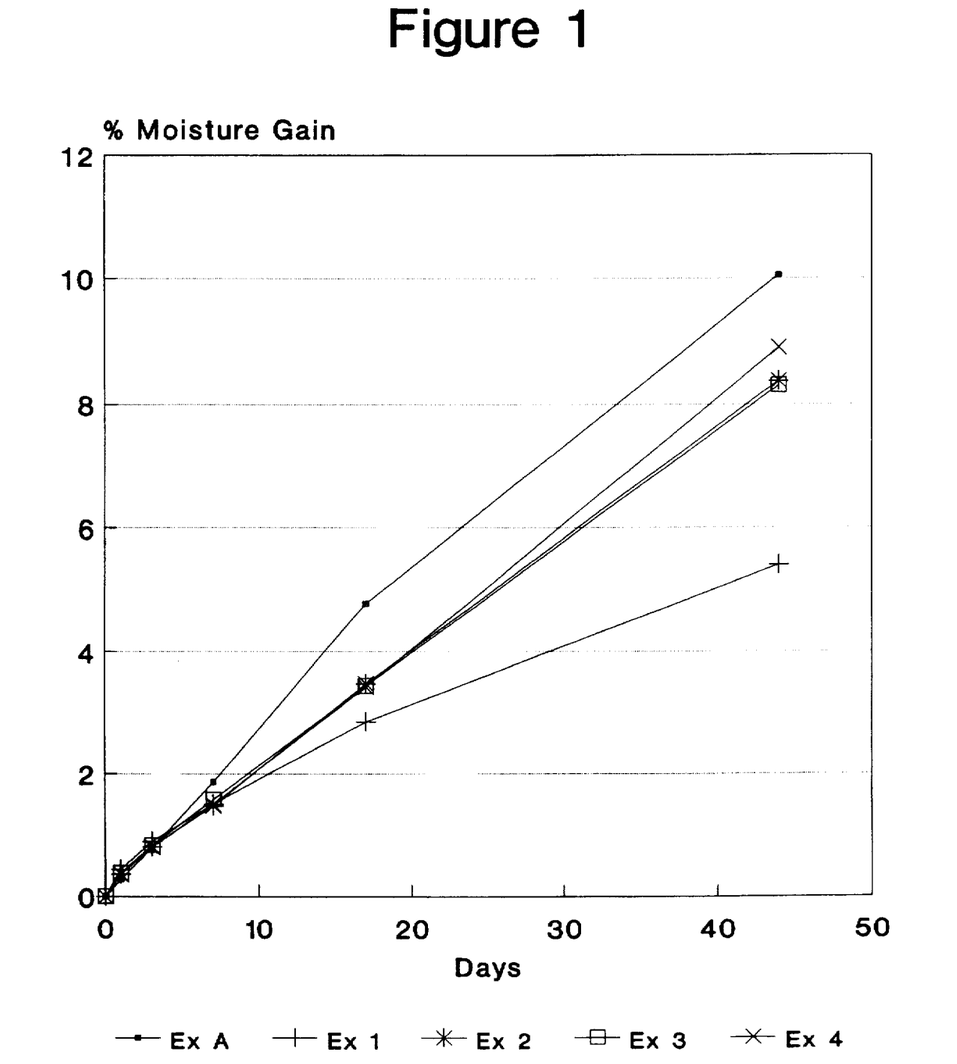
FIG. 1 is a graph showing the moisture gain of coated chewing gum samples at 80% relative humidity.

Samples of the products made in comparative Example A and Examples 1–4 were placed in a controlled, high humidity environment to test moisture gain attributes of the coating. The samples were stored at 80% relative humidity for 45 days. FIG. 1 shows the moisture gain of the products over the 45 day storage period. The product coated with xylitol (comparative Example A) had the most moisture gain. All of the samples with erythritol had less moisture gain. The sample coated with erythritol as the sole coating (Example 1) had the least moisture gain. However, the dual coated products of Examples 2–4 also provide a chewing gum product which not only has the benefits of an erythritol coating, but provides an improved coating quality that is shelf stable when exposed to atmospheric moisture.

EXAMPLE 5

ERYTHRITOL AND MALTITOL COATINGS

Using any center formula from Tables I through V, 1000 grams of pellet can be coated by first applying 20 applications of an erythritol solution containing 900 grams of erythritol, 66 grams of gum arabic, 10 grams of $TiO_2$ and 433 grams in the water. With the initial piece weight of 0.94 grams, pellets can be coated with erythritol to a piece weight of 1.18 grams, for a product which is 20.3% erythritol coating and 79.7% center. The maltitol coating solution can be prepared by mixing 1200 grams of maltitol, 20 grams of gum arabic, 10 grams of $TiO_2$ and 840 grams of water. A 1000 gram quantity of erythritol-coated gum can then be coated with the maltitol coating solution to a piece weight of 1.44 grams, for a product which is 34.7% erythritol and maltitol coating, and 65.3% center.

It is well known that solutions containing two different sugars or sugar alcohols do not crystallize the same way that a solution containing only one component does. When forming hard shell coatings, crystallization is important.

To obtain good coatings, fast even crystallization must occur during application and drying. For boiled sugar solutions, this can only be done with pure sucrose. There can be no other contamination with other crystallizable sugars. Care must be taken to avoid inversion of sucrose to dextrose and fructose, since even the smallest amount of inversion causes problems in crystallization and yields a poor coating. Similarly, dextrose panning must also use pure dextrose to obtain good crystallization and good coating.

Where sugarless coatings are desired, pure sorbitol, xylitol or maltitol have been used. Therefore, when using erythritol and another sugar alcohol or sugar to make a coating, the dual layer coating approach is preferred. As discussed in detail below, tests with erythritol and xylitol in solution together have shown, however, that both polyols will crystallize together. As for coatings made from syrups with a combination of erythritol and other polyols, or sugars, the appearance of the coating may be affected by the crystallization difficulties, unless other procedures are followed that promote crystallization or otherwise compensate for the crystallization difficulties. Of course, in some instances, the appearance problems may not cause the overall product to be unsatisfactory.

It has been discovered that xylitol and erythritol may be combined in a single solution and applied to a center by conventional panning to produce a quality coated product where the erythritol and xylitol are cocrystallized. On a solids basis, the amount of xylitol in the solution may vary from about 5% to about 95% and the amount of erythritol may vary from about 5% to about 95%. Preferably the xylitol portion of the solids in the solution should be about 40% to about 80%, with the solids in the solution comprising about 20% to about 60% erythritol. More preferably the solids in the solution will contain about 50% to about 65% xylitol and about 35% to about 50% erythritol. The concentration of the combined polyols may range from about 50% to about 85% polyols in water. Preferably the solution will contain about 60% to about 80% polyols, and more preferably about 70% to about 75% polyols in water.

Conventional panning procedures may be used to coat with the xylitol/erythritol blend syrup. These materials may be blended with panning modifiers including, but not limited to, gum arabic, maltodextrin, corn syrup solids, gelatin, cellulose type materials like carboxymethyl cellulose, hydroxypropylmethyl cellulose, starches, modified starches and vegetable gum. These may act as binders or film forming agents to modify the coating. Antitack agents such as insoluble carbonates like calcium or magnesium carbonate, or talc, as well as colorants like titanium dioxide, dyes, lake pigments or natural colors may be added to the coating. A flavor may also be added to the coating to yield unique product characteristics. The coated product may be polished with powdered wax or polished with alcohol or aqueous based polishing agents.

Gum formulation, coating sequence and processing conditions are outlined above. Following those procedures, a gum was made with the following formula:

| Center Formula U | % |
| --- | --- |
| Sorbitol | 44.06 |
| Base | 33.0 |
| Calcium Carbonate | 33.0 |
| Glycerin | 8.0 |
| Peppermint Flavor | 1.8 |
| Encapsulated Aspartame | 0.14 |
| | 100.00 |

This center formulation was formed into pillow shaped cores and used in the following eleven gum coating trials (Comparative Example B and Examples 6–15). For each trial, 1000 grams of gum cores were used. Each gum core piece weighed 1.0 gram and was coated to a piece weight of 1.6 grams unless otherwise noted. This gave a product that was 37.5% coating and 62.5% gum center. The drying air temperature was 85°–90° F. at less than 40% R.H. The air volume varied with each application, as did the quantity of syrup, depending on the smoothness of the pellets and the stickiness of each application. Syrups were prepared by dissolving the polyols in water, heating to boiling, and holding at about 150°–200° F.

COMPARATIVE EXAMPLE B

A solution was prepared using 2100 grams of xylitol (63.05%), 1116 grams of water (33.5%), 99 grams of gum arabic (3%) as a 33% aqueous solution, and 15 grams of $TiO_2$ (0.45%). The solution was used to coat the sugarless gum cores of Formula U. The coating was smooth, crunchy and slightly cooling.

EXAMPLE 6

A solution using a ratio of 50/50 erythritol/xylitol was made from 350 grams of erythritol and 350 grams of xylitol dissolved in 300 grams of water and heated to 180° F. to dissolve the polyols. Gum pieces were coated to 1.45 grams, giving a coating of 31%. The final product coating was crunchy and had an even covering, but peeled easily from the core and had a slight sandpaper finish. No gum arabic or whitener was used.

EXAMPLE 7

Another trial was made using a ratio of 95/5 xylitol/erythritol. A solution was made using 665 grams of xylitol, 35 grams of erythritol, 60 grams of a 33% solution of gum arabic and 10 grams $TiO_2$ in 300 grams of water. Pellets were coated to about 1.5 grams giving a 33% coating. The product coating was crunchy, with a very rough surface.

EXAMPLE 8

Another trial was made using the same coating mixture as Example 7, but without the gum arabic solution. Pellets were coated to 1.5 grams, giving a 33% coating. The coating was smoother, still crunchy, but had damaged corners.

EXAMPLE 9

This trial used a ratio of 80/20 xylitol/ erythritol. A solution was made using 560 grams of xylitol, 140 grams of erythritol, 20 grams of powdered gum arabic and 10 grams $TiO_2$ dissolved in 300 grams of water. Pellets were coated to 1.6 grams, producing a smooth, crunchy coating that was slightly pitted.

EXAMPLE 10

This trial used a ratio of 50/50 xylitol/ erythritol. A solution was made using 350 grams of xylitol, 350 grams of erythritol, 20 grams of powdered gum arabic and 10 grams $TiO_2$ dissolved in 300 grams of water. Pellets were coated to 1.6 grams, producing a smooth, crunchy coating.

EXAMPLE 11

This trial used a ratio of 10/90 xylitol/ erythritol. A solution was made using 84 grams of xylitol, 756 grams of erythritol, 24 grams of powdered gum arabic and 12 grams $TiO_2$ dissolved in 360 grams of water. Pellets were coated to 1.6 grams, producing a lumpy, rough surface that was crunchy.

EXAMPLE 12

This trial used a ratio of 20/80 xylitol/ erythritol. A solution was made using 168 grams of xylitol, 672 grams of erythritol, 24 grams of powdered gum arabic and 12 grams $TiO_2$ dissolved in 360 grams of water. Pellets were coated to 1.6 grams, producing a lumpy, rough surface that was crunchy. However, the surface was smoother than Example 11.

EXAMPLE 13

This trial used a ratio of 65/35 xylitol/ erythritol. A solution was made using 546 grams of xylitol, 294 grams of erythritol, 24 grams of powdered gum arabic and 12 grams $TiO_2$ dissolved in 360 grams of water. Pellets were coated to 1.6 grams, producing a good smooth even surface that was slightly pitted but crunchy.

EXAMPLE 14

This trial used the same solution as Example 13 for about one half of the coating applications. Then another solution made of 500 grams of xylitol and 250 grams of erythritol dissolved in 250 grams of water was used to coat the final piece to a weight of 1.6 grams. The product had a smooth, even, crunchy coating.

EXAMPLE 15

This coating trial used a ratio of 50/50 xylitol/erythritol. A solution was made using 375 grams of xylitol and 375 grams of erythritol dissolved in 250 grams of water. The solution thus did not contain a whitener. The solution was divided in half and to the first half was added 10 grams of powdered gum arabic, which dissolved in the solution. The pellets were coated half way with this solution, then finished with the other half of the solution containing no gum arabic. Pellets were coated to 1.5 grams. The solutions gave a smooth, crunchy coating.

The fact that each of the Examples 6–15 produced a crunchy coating shows that in each of the blends, the xylitol and erythritol cocrystallize to form a hard shell coating.

SHELF LIFE TESTS

Figure 2:
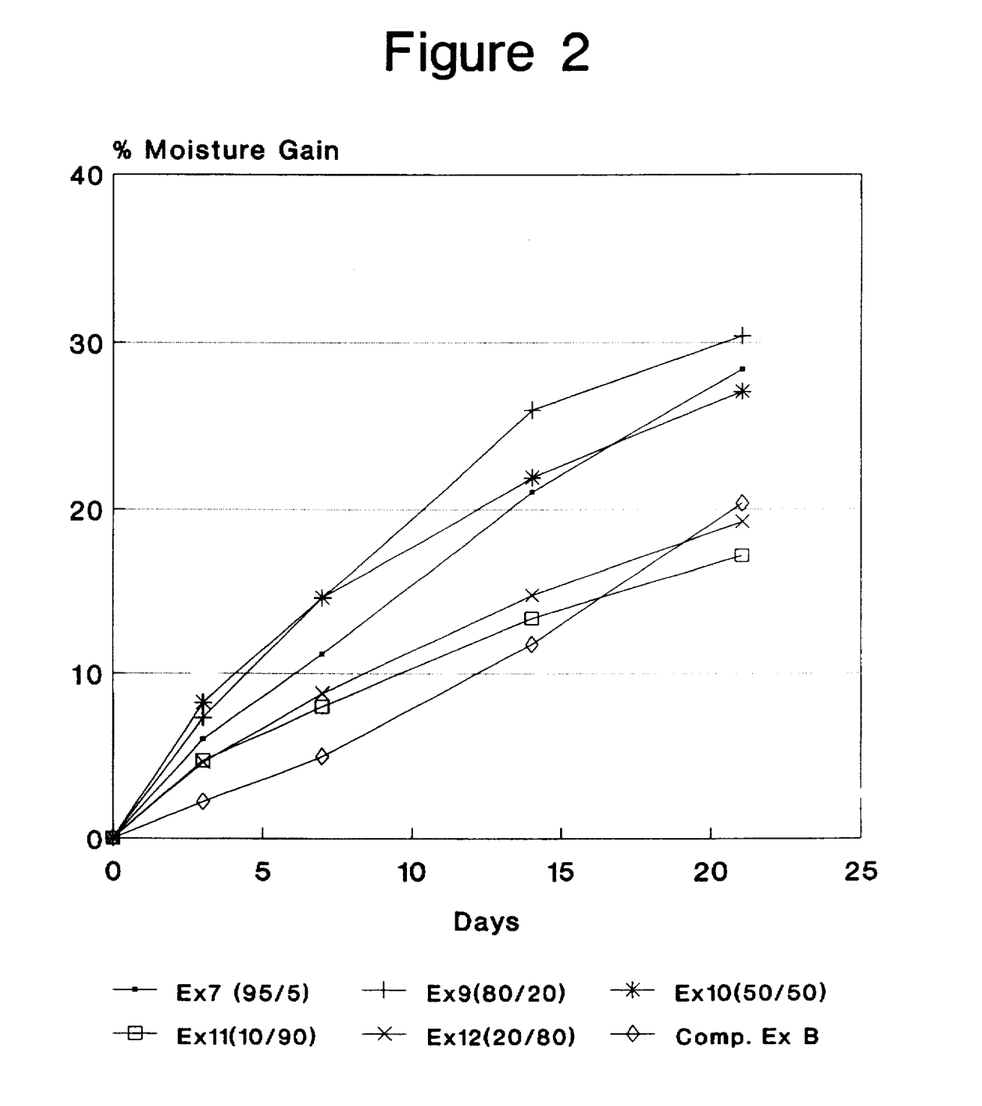
FIGS. 2 and 3 are graphs showing the moisture gain of other coated chewing gum pieces at 79% relative humidity.
Figure 3:
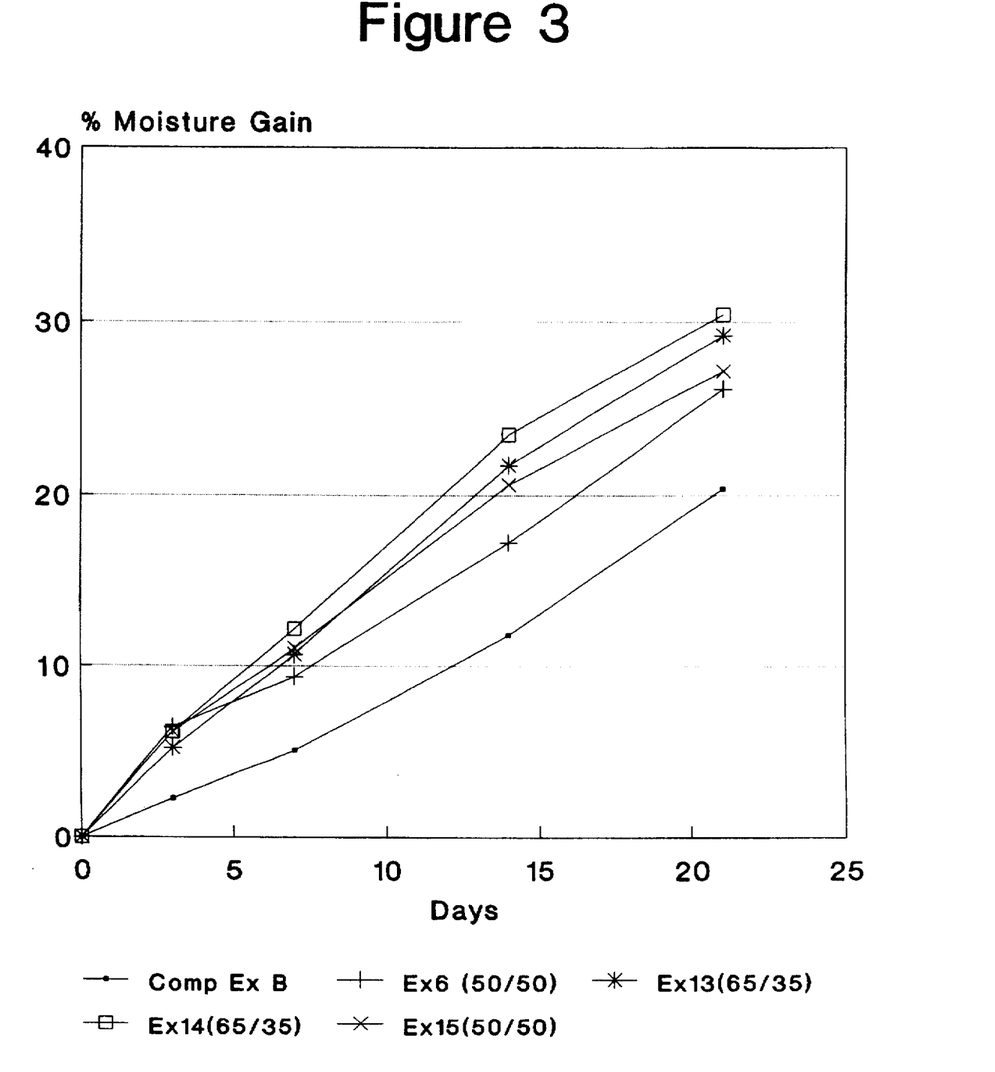

The samples of Comparative Example B and Examples 6–15 were shelf life tested by weighing 3 pieces of each example, placing samples in a desiccator at 79% R.H. and 73° F. and reweighing to determine the percent moisture gain at 0, 3, 7, 14 and 21 days. Results are shown for Comparative Example B and Examples 7, 9, 10, 11 and 12 in FIG. 2 and for Comparative Example B and Examples 6, 13, 14 and 15 in FIG. 3. The results of the tests show the effect of varying the ratio of xylitol to erythritol (FIG. 2) and also indicate that all blends are about the same or more hygroscopic than a 100% xylitol coating (FIG. 3).

It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A chewing gum product comprising:
   a) a gum pellet comprising chewable gum base, a bulking portion and one or more flavoring agents; and
   b) a hard coating covering said pellet, said coating comprising erythritol and xylitol cocrystallized in the coating.

2. The chewing gum product of claim 1 wherein the erythritol comprises about 5% to about 95% of the coating.

3. The chewing gum product of claim 1 wherein the xylitol comprises about 5% to about 95% of the coating.

4. The chewing gum product of claim 1 wherein the xylitol comprises about 40% to about 80% of the coating.

5. The chewing gum product of claim 1 wherein the erythritol comprises about 20% to about 60% of the coating.

6. The chewing gum product of claim 1 wherein the xylitol comprises about 50% to about 65% of the coating.

7. The chewing gum product of claim 1 wherein the erythritol comprises about 35% to about 50% of the coating.

8. The chewing gum product of claim 1 wherein the coating further comprises a binder.

9. The chewing gum product of claim 8 wherein the binder comprises gum arabic.

10. The chewing gum product of claim 1 wherein the coating further comprises a whitener.

11. The chewing gum product of claim 1 wherein the coating further comprises a flavoring agent.

12. The chewing gum product of claim 1 wherein the coating comprises about 10% to about 65% of the product.

13. A method of making a hard coated chewing gum product comprising the steps of:
    a) forming a gum center comprising chewable gum base, a bulking portion and one or more flavoring agents; and
    b) forming on said gum pellet a hard coating comprising erythritol and xylitol cocrystallized in the coating.

14. The method of claim 13 wherein the hard coating is formed by applying a liquid coating comprising erythritol, xylitol and solvent in a plurality of coats to the gum center and evaporating solvent from each coat prior to applying the next coat.

15. The method of claim 14 wherein the liquid coating comprises, on a solids basis, from about 5% to about 95% erythritol and about 5% to about 95% xylitol.

16. The method of claim 14 wherein the liquid coating comprises, on a solids basis, about 20% to about 60% erythritol and about 40% to about 80% xylitol.

17. The method of claim 14 wherein the liquid coating comprises, on a solids basis, about 50% to about 65% xylitol and about 35% to about 50% erythritol.

18. The method of claim 14 wherein the solvent comprises water.

19. The method of claim 14 wherein the liquid coating comprises about 50% to about 85% polyols.

20. The method of claim 13 wherein the hard coating comprises from about 10% to about 65% of the product.

* * * * *

UNITED STATES PATENT AND TRADEMARK OFFICE
CERTIFICATE OF CORRECTION

PATENT NO. : 5,536,511
DATED : July 16, 1996
INVENTOR(S) : Robert J. Yatka

It is certified that error appears in the above-indentified patent and that said Letters Patent is hereby corrected as shown below:

<u>In the Title Page</u>

In column 2, line 9, under "OTHER PUBLICATIONS" replace "182 184" with --182-184--.

In column 2, line 5, replace "Fronczowski" with --Fronczkowski--.

In column 2, line 41, replace ""ies"" with --ies",

In column 3, line 52, replace "for" with --from--.

In column 4, line 66, replace "coca" with --cocoa--.

In column 6, line 15, replace "maybe" with --may be-.

Signed and Sealed this

Eighteenth Day of May, 1999

Attest:

Q. TODD DICKINSON

*Attesting Officer*            *Acting Commissioner of Patents and Trademarks*